(12) United States Patent
Fujiyama et al.

(10) Patent No.: US 8,313,548 B2
(45) Date of Patent: Nov. 20, 2012

(54) METHOD OF DESIGNING GAS-SOLID SEPARATOR

(75) Inventors: Yuichiro Fujiyama, Yokohama (JP); Toshiaki Okuhara, Yokohama (JP); Shigeko Okuhara, legal representative, Fujisawa (JP); Akira Uchiura, Yokohama (JP)

(73) Assignees: Japan Cooperation Center, Petroleum, Tokyo (JP); Nippon Oil Corporation, Tokyo (JP)

( * ) Notice: Subject to any disclaimer, the term of this patent is extended or adjusted under 35 U.S.C. 154(b) by 619 days.

(21) Appl. No.: 12/373,122

(22) PCT Filed: Jul. 5, 2007

(86) PCT No.: PCT/JP2007/063449
§ 371 (c)(1),
(2), (4) Date: Jan. 12, 2010

(87) PCT Pub. No.: WO2008/007601
PCT Pub. Date: Jan. 17, 2008

(65) Prior Publication Data
US 2010/0186355 A1 Jul. 29, 2010

(30) Foreign Application Priority Data
Jul. 12, 2006 (JP) .................... 2006-192144

(51) Int. Cl.
*B01D 45/00* (2006.01)
(52) U.S. Cl. .......... 55/440; 55/452; 55/441; 55/442; 55/443; 55/444; 55/459.3; 55/447; 55/448; 55/465; 55/337; 55/427; 55/426; 55/DIG. 30

(58) Field of Classification Search ............ 55/440–444, 55/498, 459.3, 447–465, 337, DIG. 30, 427, 55/426; 422/147
See application file for complete search history.

(56) References Cited

U.S. PATENT DOCUMENTS

| 3,992,172 A | 11/1976 | Clark |
| 5,186,836 A | 2/1993 | Gauthier et al. |
| 6,146,597 A * | 11/2000 | Nishida et al. ............... 422/147 |

FOREIGN PATENT DOCUMENTS

| JP | 46-37992 | 11/1971 |
| JP | 51-115373 | 10/1976 |
| JP | 4-227868 | 8/1992 |
| JP | 10-249121 | 9/1998 |
| JP | 10-249122 | 9/1998 |

OTHER PUBLICATIONS

Y. Fujiyama, "Development of HS-FCC (high-severity fluid catalytic cracking) Technology," Nisski Review, vol. 42, No. 2, pp. 6-12 (2000).

* cited by examiner

*Primary Examiner* — Jason M Greene
*Assistant Examiner* — Dung H Bui
(74) *Attorney, Agent, or Firm* — Finnegan, Henderson, Farabow, Garrett & Dunner, LLP (57) ABSTRACT

A method of designing a gas-solid separator that has an inner cylinder having a closed lower end and an opened upper end, and extending in a vertical direction; an outer cylinder that coaxially covers the inner cylinder from the outside and has a gas vent port formed on the upper end side of the inner cylinder and communicating with an exterior; and a plurality of axially extending long holes formed a side surface on the lower end side of the inner cylinder in a circumferential direction, one of long side edge parts of each of the long holes being provided with a guide blade that protrudes outward and is inclined circumferentially so as to cover the long hole.

26 Claims, 7 Drawing Sheets

| | | EXAMPLE 1 | EXAMPLE 2 | EXAMPLE 3 | COMPARATIVE EXAMPLE 1 | EXAMPLE 4 | EXAMPLE 5 | COMPARATIVE EXAMPLE 2 | COMPARATIVE EXAMPLE 3 |
|---|---|---|---|---|---|---|---|---|---|
| SHAPE OF GUIDE BLADES | | QUARTER CIRCLE | QUARTER CIRCLE | QUARTER CIRCLE | QUARTER CIRCLE | QUARTER CIRCLE | QUARTER CIRCLE | QUARTER CIRCLE | QUARTER CIRCLE |
| SIZE OF SEPARATOR | | | | | | | | | |
| INNER CYLINDER DIAMETER mm | D3 | 1800 | 1800 | 1800 | 1800 | 1800 | 1800 | 1800 | 1800 |
| CENTRAL OUTER CYLINDER DIAMETER mm | D1 | 3450 | 3450 | 3450 | 3450 | 3200 | 3450 | 3100 | 2750 |
| CENTRAL OUTER CYLINDER LENGTH mm | La | 1450 | 1450 | 1450 | 1450 | 1450 | 1450 | 1450 | 1450 |
| PARTICLE VENT TUBE DIAMETER mm | | 2400 | 2400 | 2400 | 2400 | 2400 | 2400 | 2400 | 2400 |
| LONG HOLE VERTICAL LENGTH mm | L | 1100 | 1100 | 1100 | 1100 | 1100 | 1100 | 1100 | 1100 |
| LONG HOLE WIDTH mm | W | 200 | 170 | 150 | 100 | 200 | 200 | 200 | 200 |
| CONICAL CYLINDER CONE ANGLE ° | | 70 | 70 | 70 | 70 | 70 | 70 | 70 | 70 |
| GAS SUPPLY AMOUNT m³/h | | 111362 | 111362 | 111362 | 111362 | 111362 | 111362 | 111362 | 111362 |
| CATALYST SUPPLY AMOUNT kg/min | | 72875 | 72875 | 72875 | 72875 | 72875 | 72875 | 72875 | 72875 |
| INNER CYLINDER RISING GAS LINEAR VELOCITY m/s | | 12 | 12 | 12 | 12 | 12 | 12 | 12 | 12 |
| LONG HOLE PASSING GAS LINEAR VELOCITY m/s | | 11.7 | 13.8 | 15.6 | 23.4 | 11.7 | 11.7 | 11.7 | 11.7 |
| OUTER CYLINDER RISING GAS LINEAR VELOCITY m/s | | 4.7 | 4.7 | 4.7 | 4.7 | 5.9 | 6.6 | 6.6 | 10 |
| CATALYST COLLECTION EFFICIENCY % | | 76.5 | 80.5 | 77.0 | 70.5 | 71.5 | 62.0 | 62.0 | 52.5 |

METHOD OF DESIGNING GAS-SOLID SEPARATOR

CROSS-REFERENCE TO RELATED APPLICATIONS

This application is a national phase application of International Application No. PCT/JP2007/063449, filed Jul. 5, 2007, and claims the priority of Japanese Application No. 2006-192144, filed Jul. 12, 2006, the contents of both of which are incorporated herein by reference.

TECHNICAL FIELD

The present invention relates to a design method of a gas-solid separator for separating a mixture of solid particles and gas, into solid particles and gas.

BACKGROUND ART

A reaction system in which a particulate solid matter used as a catalyst or a heat medium is brought into contact with a reactant has conventionally been known. Some of the fluidized bed reactors functioning as this reaction system use a dense fluidized bed (bubble fluidized bed) or a high-speed moving bed (high-speed fluidized bed). The high-speed moving bed is used in a reaction that needs to reduce the time during which the solid particles are in contact with the gas (short contact time reaction). Nowadays, an upflow type high-speed moving bed reactor called "riser" has prevailed in fluid catalytic cracking units for producing gasoline using heavy oil or the like as stock oil. This is because the contact time was reduced as the catalytic performance improved, which enhanced the selectivity of the products including gasoline and prevented the occurrence of an unnecessary excessive decomposition reaction.

In the high-speed moving bed reactor, a mixture of a product gas and a particulate solid catalyst flows out of a reactor exit, and how the particulate solid catalyst can be separated promptly from the mixture is the critical issue of this type of device requiring a short contact time reaction. Therefore, the performance of the separator is very important.

The ones described in, for example, Patent Documents 1 to 3 are known as the above gas-solid separator.
Patent Document 1: Japanese Patent Application Publication No. H10-249122
Patent Document 2: U.S. Pat. No. 6,146,597
Patent Document 3: Japanese Patent Application Publication No. H10-249121

DISCLOSURE OF THE INVENTION

Problem to be Solved by the Invention

However, it turned out that the conventional gas-solid separator lacks in separation efficiency. The present invention was therefore contrived in view of the above problems, and an object thereof is to provide a gas-solid separator that has even higher efficiency of separating gas and a solid matter than the conventional gas-solid separator.

Means for Solving the Problem

A design method of a gas-solid separator according to the present invention is a design method of a gas-solid separator that has: an inner cylinder having a closed lower end and an opened upper end, and extending in a vertical direction; an outer cylinder that coaxially covers the inner cylinder from the outside and has a gas vent port formed on the upper end side of the inner cylinder and communicating with an exterior; and a plurality of axially extending long holes formed on a side surface on the lower end side of the inner cylinder in a circumferential direction, one of long side edge parts of each of the long holes being provided with a guide blade that protrudes outward and is inclined circumferentially so as to cover the long hole. When the cross-sectional average linear velocity of a mixture of gas and solid particles that falls through the inner cylinder is 3 to 30 m/s, the cross-sectional average linear velocity of the mixture of gas and solid particles that is discharged from the long holes is 20 m/s or lower and the cross-sectional average linear velocity of the gas rising between the outer cylinder and the inner cylinder in a section where the long holes are formed is 6 m/s or lower or preferably 5 m/s or lower.

According to the gas-solid separator designed by the present invention, a mixture of solid particles and gas is supplied downward from an opening of the inner cylinder and then discharged downward from each long hole of the inner cylinder into the outer cylinder. The discharged gas slightly swirls along inner surfaces of the guide blades, and further proceeds downward. Here, some of the solid particles within the mixture collide with the inner surfaces of the guide blades and directly fall downward along the inner surfaces of the guide blades. The direction of the gas including the rest of the solid particles is inverted to an upward direction due to the gas vent port provided in an upper part of the outer cylinder. The gas consequently flows upward along an outer surface of the guide blade provided to the edge part of the adjacent long hole and is thereafter discharged from the gas vent port. When the downward direction of the gas flow is inverted to the upward direction, the solid particles accompanied with the gas are separated from the gas due to their inertia or deadweight and descend mainly along an inner wall while being swirled downward.

Particularly, when the cross-sectional average linear velocity of the mixture of gas and solid particles that falls through the inner cylinder is 3 to 30 m/s, the cross-sectional average linear velocity of the mixture of gas and solid particles that is discharged from the long holes is 20 m/s or lower and the cross-sectional average linear velocity of the gas rising between the outer cylinder and the inner cylinder in a section where the long holes are formed is 6 m/s or lower or preferably 5 m/s or lower.

Accordingly, when the mixture is supplied at the cross-sectional average velocity of 3 to 30 m/s, the cross-sectional average linear velocity of the mixture of gas and solid particles that is discharged from the long holes becomes 15 m/s or lower, and the cross-sectional average velocity of the gas rising between the outer cylinder and the inner cylinder becomes 6 m/s or lower. Therefore, good gas-solid separation property can be achieved.

Effects of the Invention

The present invention provides a design method of a gas-solid separator that has even higher efficiency of separating gas and a solid matter than to the conventional gas-solid separator.

EXPLANATION OF REFERENCE NUMERALS

2 . . . Outer cylinder
2a . . . Central outer cylinder
3 . . . Particle vent port
4 . . . Long hole
5 . . . Guide blade
6 . . . Gas vent port
10 . . . Inner cylinder
100, 102 . . . Gas-solid separator

BEST MODE FOR CARRYING OUT THE INVENTION

First Embodiment

Figure 1:
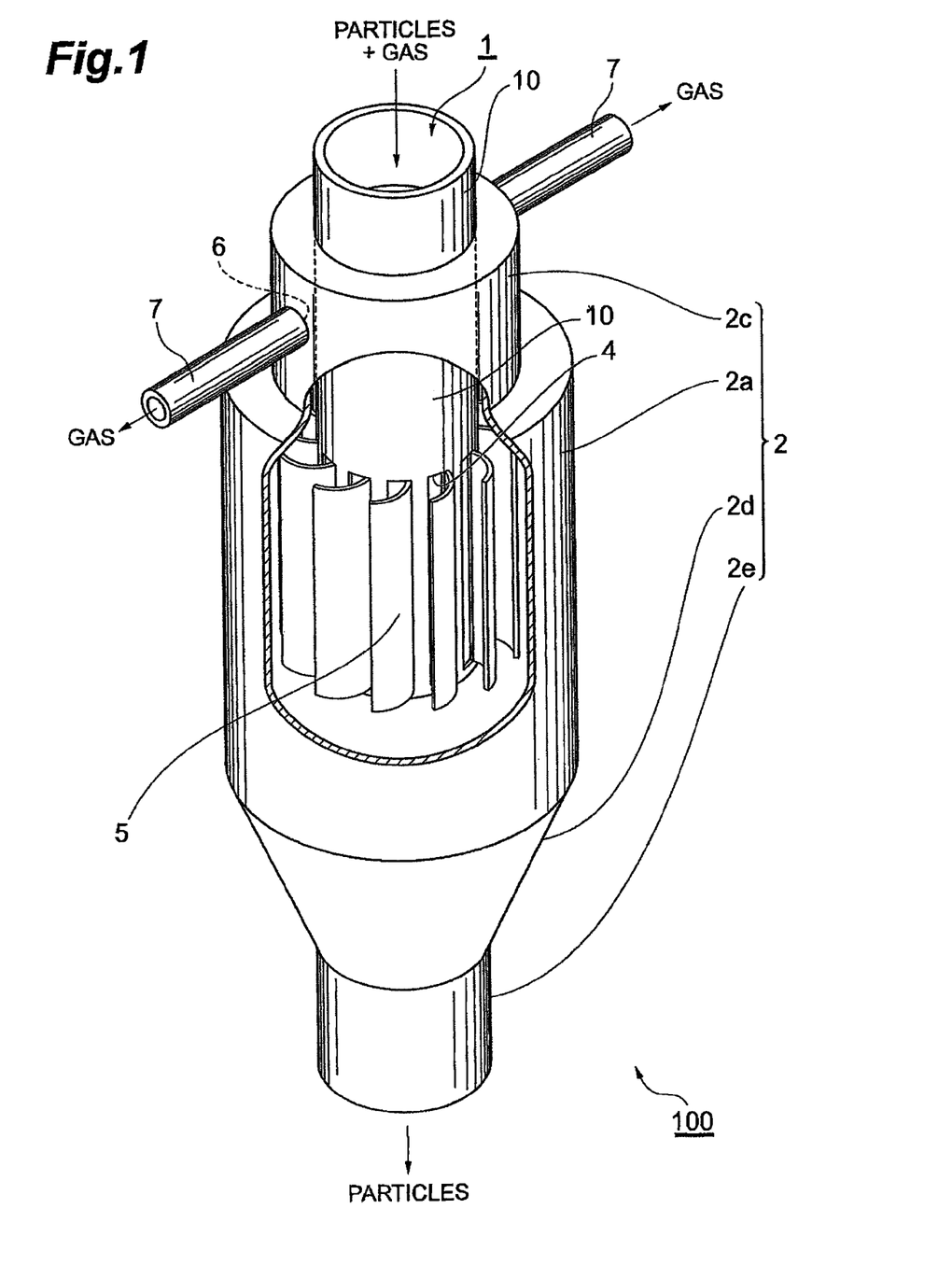
FIG. 1 is a partial broken perspective view of a gas-solid separator according to a first embodiment.

The present invention is now described hereinafter in detail with reference to the drawings. FIGS. 1 to 4 show one aspect of a gas-solid separator according to the first embodiment, FIG. 1 showing a partial broken perspective view, FIG. 2 a longitudinal cross-sectional view of the gas-solid separator of FIG. 1, FIG. 3 a cross-sectional view taken along the plane of the gas-solid separator, and FIG. 4 a perspective view showing a flow in the vicinity of guide blades.

A gas-solid separator 100, configured into a substantially cylindrical double structure with mainly an inner cylinder 10 mounted coaxially in a fixed condition and an outer cylinder 2 serving as an envelope, is used in a vertically extended position.

(Inner Cylinder)

Figure 2:
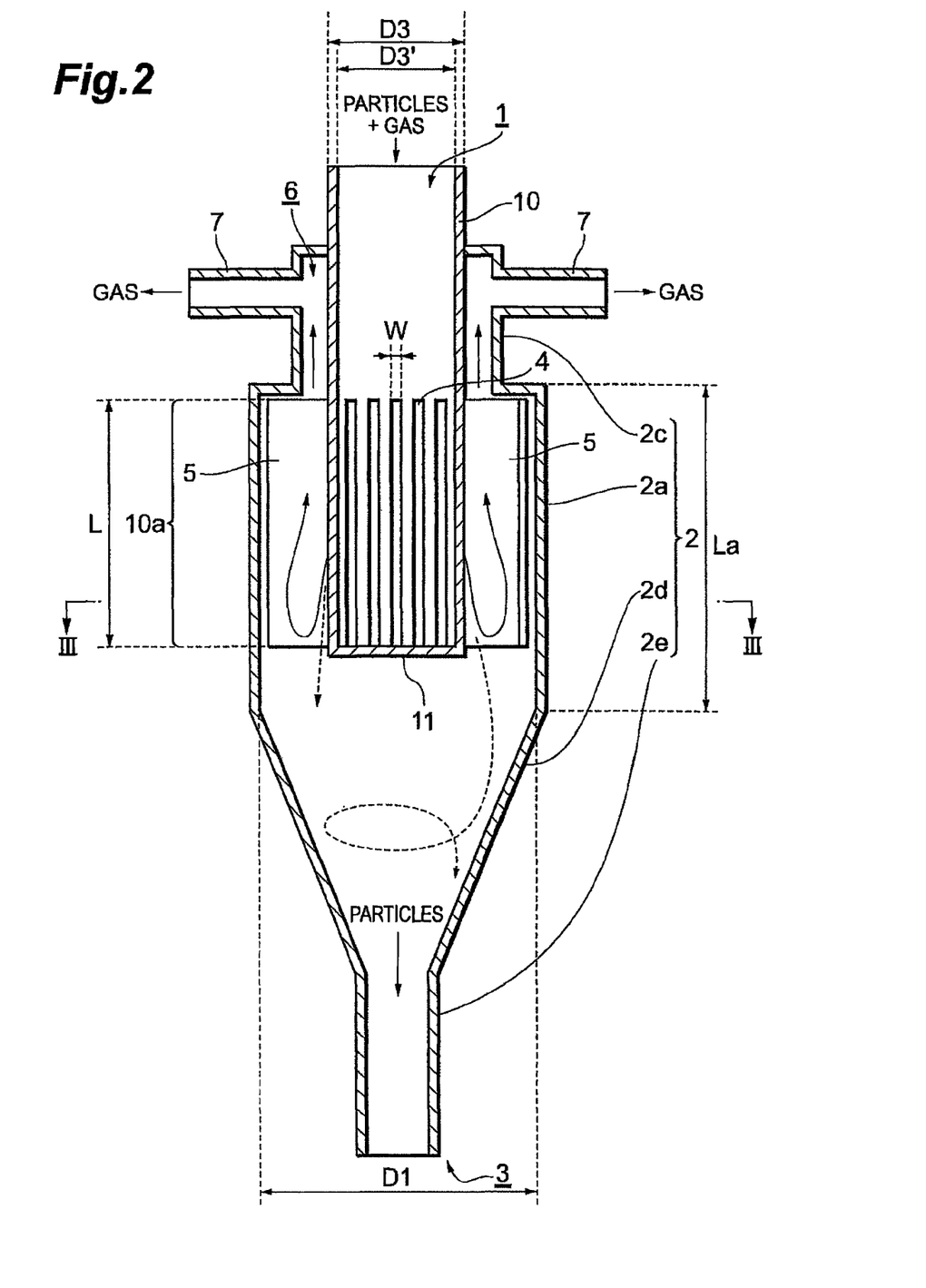
FIG. 2 is a longitudinal sectional view of the gas-solid separator shown in FIG. 1.

The vertically extending inner cylinder 10 having a bottomed cylindrical shape has an inlet 1 formed at its opened upper end, and a mixture of particles and gas is fed from this inlet 1. A lower end of the inner cylinder 10 is sealed by a bottom plate 11.

With regard to the size of the inner cylinder 10, an outer diameter D3 thereof is preferably the same as that of an unshown mixture transfer tube connected directly to the upstream side. However, the outer diameter D3 may be reduced or increased in order to obtain appropriate linear velocity of the mixture passing through the inner cylinder 10. Specifically, the diameter of the inner cylinder is preferably defined such that the downward cross-sectional average linear velocity $U_{10}$ of the mixture of the inner cylinder 10 becomes 3 to 30 m/s or preferably 10 to 20 m/s. When $U_{10}$ falls below 3 m/s, the speed of falling particles increases and sufficient inertia cannot be obtained, making it difficult to perform the separation.

On a side surface of the bottom plate 11 of the inner cylinder 10, a plurality of axially extending long holes (slits) 4 having a narrow rectangular shape (twelve of them in the diagram) are formed at circumferentially equally spaced parts.

The number of long holes 4 and the opening area are determined such that the cross-sectional average linear velocity of the mixture of gas and solid particles that passes through each long hole 4 becomes 20 m/s or lower or preferably 15 m/s or lower when the downward cross-sectional average linear velocity of the mixture supplied to the inner cylinder 10 is set at 3 to 30 m/s. Linear velocity $U_4$ of the mixture passing through each long hole 4 can be obtained from $(\pi/4)(D3')^2 \cdot U_{10} = S \cdot n \cdot U_4$ using inner diameter D3' of the inner cylinder 10 ($\approx$D3), cross-sectional average linear velocity $U_{10}$ of the mixture falling through the inner cylinder 10, the opening area S of each long hole 4, and the number n of long holes. Once the area of the long hole 4 is determined, the width W and the length L of the long hole 4 can be determined accordingly. When the linear velocity of the mixture passing through the long hole 4 is higher than 20 m/s, more force is applied to the particles in the lateral direction. Consequently, the solid particles are discharged from relatively upper part of the long hole 4 and easily involved in the gas when the flow of gas is inverted from downward to upward, as described hereinafter. Moreover, the long hole 4, guide blade 5 and side wall of the outer cylinder 2 become worn dramatically. Although the lower limit is not particularly limited, when the cross-sectional average linear velocity of the mixture passing through the long hole 4 is lower than 3 m/s, the velocity of the mixture decreases, whereby the sufficient centrifugal force cannot be applied, making it difficult to perform sufficient separation. Therefore, it is preferred that the cross-sectional average linear velocity of the mixture passing through the long hole 4 be at least 3 m/s when the downward cross-sectional average linear velocity of the mixture supplied to the inner cylinder 10 is 3 to 30 m/s.

The practical width W of the long hole 4 in the horizontal direction is expressed in, for example, the following equations within the scope of satisfying the above conditions, where L1 represents the circumferential length of the inner cylinder 10.

Width W of slit=3 mm to L1/4, or preferably W=L1/16 to L1/64.

Moreover, the practical vertical length L of the long hole 4 is expressed in, for example, the following equation where La represents the height of a central outer cylinder 2a, within the scope of satisfying the above conditions.

Length L of slit=La×a, where a is 0.1 to 0.99 or preferably 0.7 to 0.95.

Figure 3:
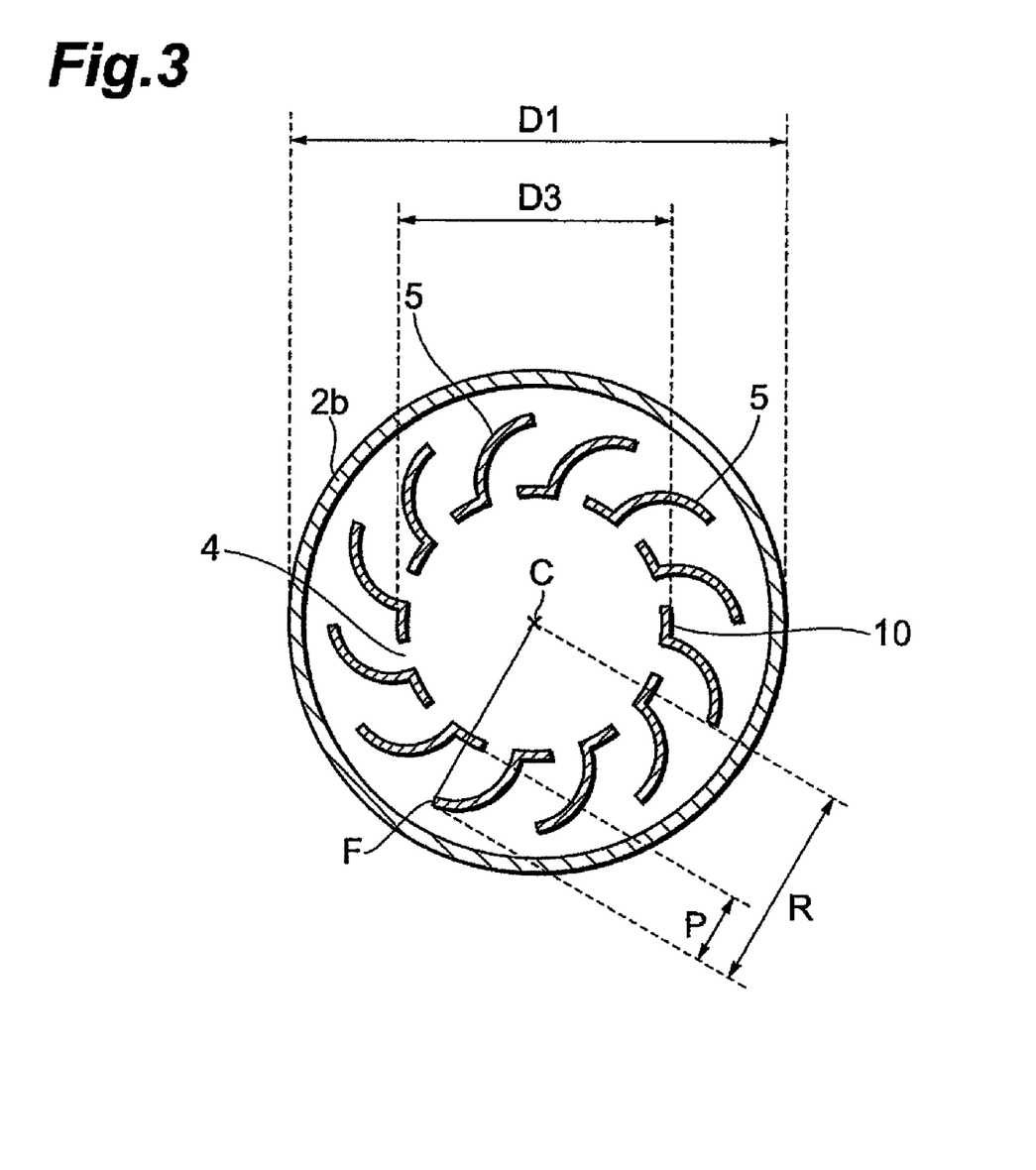
FIG. 3 is a cross-sectional view taken along the line III-III of FIG. 2.
Figure 5:
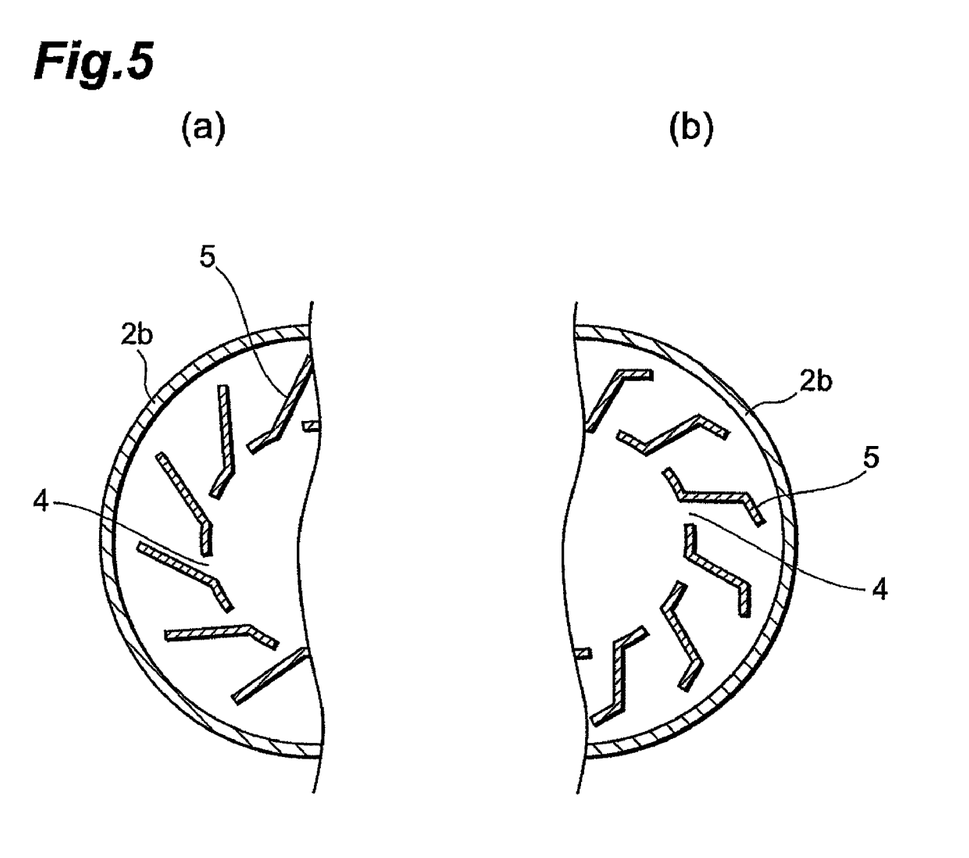
FIG. 5 is a cross-sectional view showing a modification of the guide blades shown in FIG. 3, wherein (a) shows flat guide blades and (b) bent guide blades.

One of long side edge parts of each of the long holes 4 is provided with the long curved-plate like guide blade 5 protruding outward. Specifically, the guide blades 5 are provided as many as the long holes 4 along the long side edge parts of the respective long holes 4. Each of these guide blades 5 forms a fixed angle with a radial direction of the inner cylinder. In other words, each of the guide blades 5 is provided at a tilt in a fixed circumferential direction, so as to cover each long hole 4. The inclination may be curved as shown in FIGS. 1 and 3, flat as shown in the cross-sectional view of (a) of FIG. 5, or partially bent plate-like as shown in (b) of FIG. 5. In the case of the curved inclination, the curved surface where the side facing the tong hole 4 is concaved as shown in FIG. 3, particularly an arcuate cross-section, is preferred. When the inclination has the arcuate cross-section, the apex angle is preferably 70 to 120 degrees with radius r, and $0.4 \times (D1-D3) \leq r \leq 0.5 \times (D1-D3)$ is preferably established, where the outer diameter of the inner cylinder 10 is D3 and an inner diameter of the central outer cylinder 2a is D1.

It is preferred that all of the guide blades 5 be formed into the same shape and positioned at circumferentially equally spaced parts in order to obtain a smooth operation in the entire separator. Note that the guide blades 5 with a plurality of divided configurations may be provided to a single long hole 4.

Radial direction protruding length P of each guide blade 5 (see FIG. 3), i.e. ((Distance R between the center C of the inner cylinder 10 and a leading end F of the guide blade 5)−0.5×Outer diameter D3 of the inner cylinder 10), is preferably set by the following equation, where the inner diameter of the central outer cylinder 2a is D1.

Protruding length P of guide blade=(R−0.5×D3)=0.5×(D1−D3)×b, where b is 0.2 to 0.99 or preferably 0.7 to 0.95.

When b is smaller than 0.2, that is, when the value of the radial direction protruding length P of each guide blade 5 is excessively small, the flow of gas ejected from the long holes 4 cannot be inverted accurately. When b is larger than 0.99, that is, when the value of the radial direction protruding length P of the guide blade is excessively large, the gap between the outer cylinder and the guide blade becomes excessively small, which brings the guide blade or the like into contact with the outer cylinder.

It is preferred that the vertical length of the guide blade 5 be approximately equal to the vertical length L of each long hole 4 and can be defined as follows.

Minimum height of guide blade 5=Length L of long hole 4/2

Maximum height of guide blade 5=Length of outer cylinder 2

Preferably, the vertical length of the guide blade 5 is at least the length L of long hole 4 or equal to 0.8×length of outer cylinder 2.

The number n of long holes 4 is twelve in the illustrated examples but is not limited to this and thus may be two or more. It is preferred that the number of long holes 4 be eight to sixteen, or more preferably ten to fourteen. When there is only a single long hole 4 (less than two), inconvenience is caused because the gas flow inversion required for performing separation in the gap between the inner and outer cylinders cannot be achieved. In addition, although depending on the size of the inner cylinder 10, such as its diameter, even when more than sixteen long holes are provided, the separator becomes unnecessarily complicated and expensive. Therefore, no significant improvement in the separation efficiency is confirmed.

(Outer Cylinder)

The outer cylinder 2 is a cylindrical body that covers the inner cylinder 10 from the outside and is positioned coaxially. The outer cylinder 2 is configured by, from top down, a gas guide cylinder 2c, the cylindrical central outer cylinder 2a, a conical cylinder 2d, and a particle vent tube 2e. Particularly, the central outer cylinder 2a is formed so as to surround a part 10a in which the plurality of long holes 4 of the inner cylinder 10 are formed. It is preferred that the central outer cylinder 2a further extend downward from the bottom plate 11 of the inner cylinder 10.

In the present embodiment, when the outer diameter of the inner cylinder 10 is D3, under the condition where the downward cross-sectional average linear velocity of the mixture of gas and solid particles supplied to the inner cylinder 10 is set at 3 to 30 m/s, the inner diameter D1 of the central outer cylinder 2a is set such that the cross-sectional average linear velocity $U_d$ of the gas rising between the central outer cylinder 2a and the inner cylinder 10 becomes 6 m/s or lower or preferably 5 m/s or lower. The cross-sectional average linear velocity) $U_d$ can be obtained from $(\pi/4)(D3')^2 \cdot U_{10} \cdot \epsilon = (\pi/4)((D1)^2-(D3)^2) \cdot U_d$, where D3 and D3' (≈D3) represent the outer diameter and the inner diameter of the inner cylinder 10 respectively, $U_{10}$ the linear velocity of the mixture falling through the inner cylinder 10, $\epsilon$ the volume fraction of the gas within the mixture, and D1 the inner diameter of the central outer cylinder 2a. Normally, e can be approximately 1.

When $U_d$ exceeds 6 m/s, the solid particles is easily involved in the rising gas flow, which makes it difficult to separate the solid substance. Although the lower limit of $U_d$ is not particularly limited, considering reducing the residence time during which the gas retains in the separator, it is preferred that the lower limit be at least 2 m/s.

Note that D1 can be 1.1×D3 to 5×D3 or 1.1×D3 to 3×D3, within the scope of satisfying the above conditions.

It is also preferred that the height La of the central outer cylinder 2a be 0.8 to 10 times the inner diameter D3 of the inner cylinder 10. Considering reducing the residence time, it is preferred that La be reduced on the basis of the vertical length of each long hole 4. Specifically, La is preferably 1 to 5 times as large as D3.

On the central outer cylinder 2a is disposed the cylindrical gas guide cylinder 2c having a smaller diameter than the central outer cylinder 2a, and a gas vent port 6 is formed at two opposing positions on a side surface of the gas guide cylinder 2c. Gas vent tubes 7 communicated with the outside and extending in the radial direction are connected with the gas vent ports 6, respectively. The gas vent tubes 7 may be inclined upward or downward.

On the other hand, the conical cylinder 2d tapering downward and the small diameter particle vent tube 2e are connected in this order with a lower end of the central outer cylinder 2a. The particles are discharged from a particle vent port 3 provided at a lower end of the particle vent tube 2e. The gas is not constantly discharged from the particle vent port 3 of the particle vent tube 2e but is discharged constantly only through the gas vent tubes 7. The outer cylinder 2 and the inner cylinder 10 are communicated with each other via the long holes 4 only. The opening size of the particle vent port 3 of the particle vent tube 2e is preferably 0.6 to 2 times the outer diameter D3 of the inner cylinder 10.

Each of the above components is formed from an appropriate material that withstands chemical reactions. For example, stainless steel is an appropriate material as it is excellent in workability and has good chemical resistance. Moreover, different materials may be combined appropriately to configure each component. The important thing is that it is only necessary to use a material having necessary rigidity and resistance characteristics.

Next, the operations of the present embodiment are described. The mixture of gas and solid particles is fed from a mixture feed port 1 provided in the upper part of the gas-solid separator, downward to the inner cylinder 10 at a predetermined velocity, at the defined cross-sectional average linear velocity of 3 to 30 m/s. Although not particularly limited, examples of the solid particles include a fluid contact catalyst (FCC) that has an average particle diameter of approximately 1 to 500 μm and a particle bulk density of 0.6 to 0.9 g/cm$^3$.

The lower end part of the inner cylinder 10 is sealed by the bottom plate 11, with which some of the solid particles directly collide only immediately after starting to feed. Consequently, a solid particle bed (catalyst bed) is gradually formed and thereby the bottom plate is protected from collision/impact of the solid particles.

Figure 4:
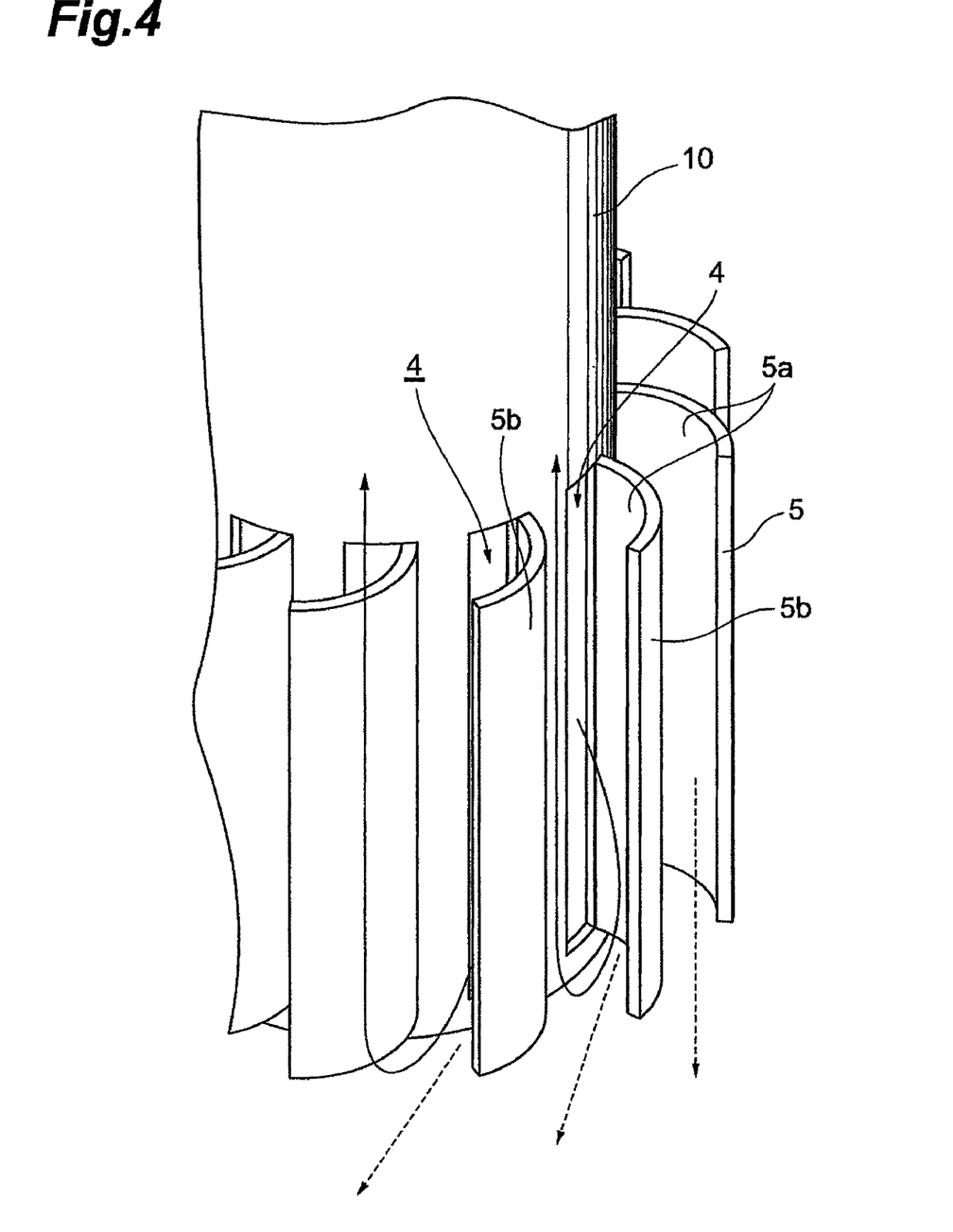
FIG. 4 is an enlarged perspective view showing the vicinity of guide blades shown in FIG. 1.

The mixture that constantly flows from the top to the bottom of the diagrams is interrupted through the bottom plate and the particle bed, which gives a lateral (horizontal direction) velocity to the flow of the mixture. The mixture then spurts out laterally downward from the plurality of holes (slits: 4) provided on the side surface of the inner cylinder 10, as shown in FIGS. 2 and 4. Here, the solid arrows show the flow of the gas, and the dashed arrows the flow of the solid particles.

Thereafter, as shown in FIG. 4, the gas flows downward out of the long holes 4, is guided to inner surfaces 5a by the guide blades 5 and slightly swirled clockwise as viewed from the top of the vertical axis in the diagram. Thereafter, the gas rises clockwise along an outer surface 5b of an adjacent guide blade 5 and is thereafter discharged from the gas vent ports 6.

Some of the solid particles, on the other hand, collide with the inner surfaces 5a of the guide blades 5 and directly move downward along the inner surfaces. Most of the rest of the particles leave the flow of the gas and directly proceed downward because the velocity of these particles is not inverted along with the gas due to their inertia or deadweight when the flow of the gas is inverted from the downward direction to the upward direction. Then, these particles are swirled along the inner surface of the conical cylinder 2d and discharged from the particle vent port 3, as shown in FIG. 2.

In this manner, the mixture of gas and solid particles is separated into gas and solid particles.

In addition, according to the invention of the present application, when the downward cross-sectional average linear velocity of the mixture within the inner cylinder 10 is set at 3 to 30 m/s, the separator is designed such that the cross-sectional average linear velocity at which the mixture is discharged from the long holes 4 and the cross-sectional average linear velocity at which the gas rises between the inner cylinder 10 and the central outer cylinder 2a become a predetermined speed or lower. Therefore, the separation efficiency of the solid particles is sufficiently improved when the downward cross-sectional average linear velocity of the mixture within the inner cylinder 10 is set at 3 to 30 m/s. Specifically, because the cross-sectional average linear velocity of the mixture discharged from the long holes 4 does not increase much, the horizontal velocity applied to the solid particles does not increase. Therefore, the solid particles are discharged from relatively lower part of the long holes 4 and thus separated easily. Because the cross-sectional average ascent velocity of the gas between the inner cylinder 10 and the central outer cylinder 2a does not increase much either, the number of solid particles involved into the rising gas can be reduced.

In this manner, the mixture can be supplied to the inner cylinder 10 at higher descent velocity, and the processing ability of the separator can be improved while maintaining the gas-solid separation performance.

Note that the additional factors affecting the separation efficiency include the particle diameter, the particle density, and the density difference between the gas and particles. The greater these [factors] are, the higher the separation efficiency becomes.

Second Embodiment

Figure 6:
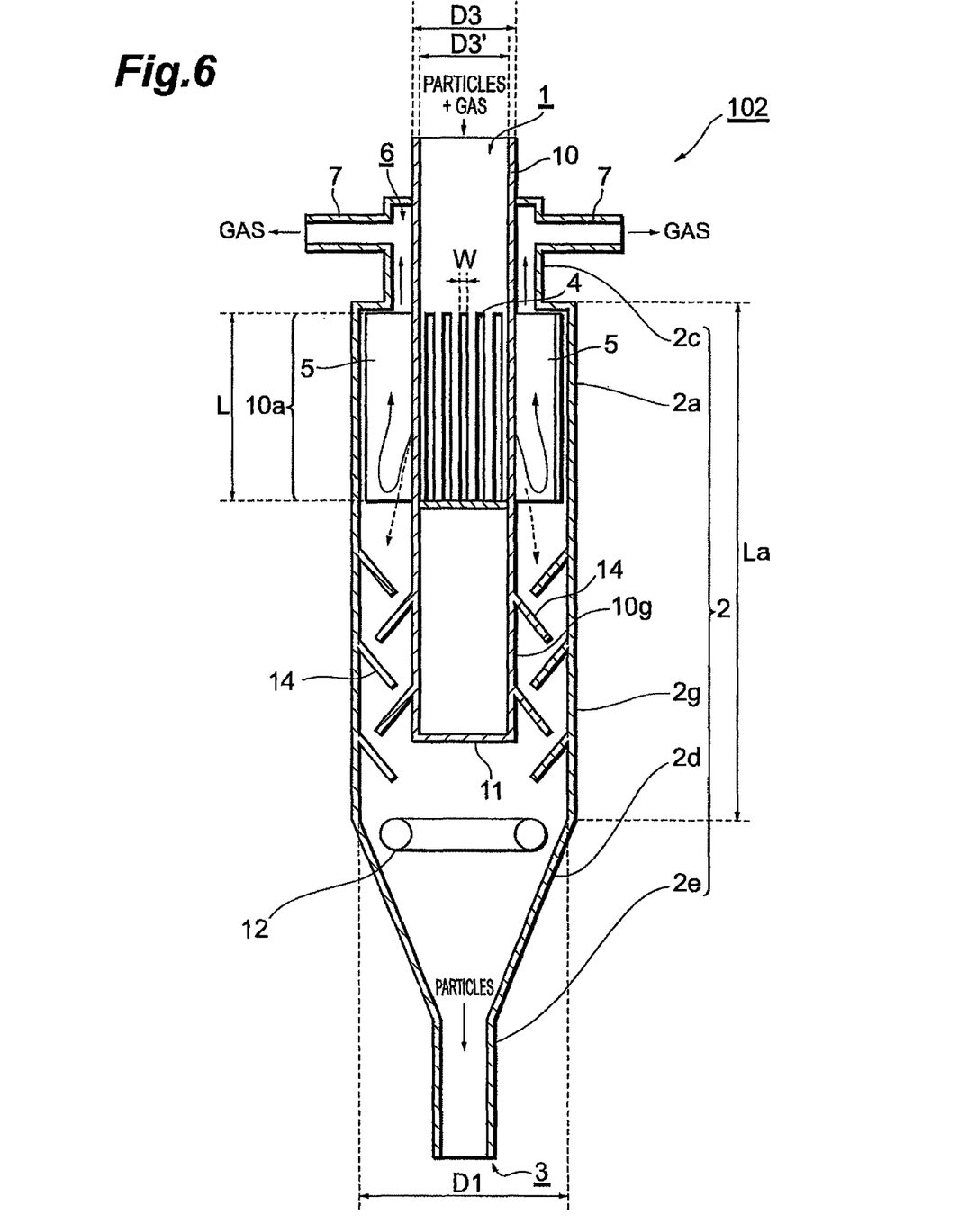
FIG. 6 is a longitudinal cross-sectional view of a gas-solid separator according to a second embodiment.

Next, the second embodiment is descried with reference to FIG. 6. When restoring the present gas-solid separator in the fluid catalytic cracking unit that produces gasoline using heavy oil as stock oil, the catalyst discharged from the particle vent port 3 has gas between the particles, and the heavy oil is adhered to the particles. Therefore, the catalyst is normally supplied from the particle vent port 3 to an unshown stripping device and then removed by inert gas, such as steam.

Sometimes the stripping device becomes the problem when it comes to a short contact time reaction. In other words, because the residence time during which the catalyst remains in the stripping device is generally long, the reaction is continued until stripping is completed. Therefore, it is preferred to install a pre-stripping device (with small capacity) of the lower residence time in order to prevent such an unnecessary reaction and to eliminate the impact of an undesirable phenomenon where some of the gas is fed from a particle vent port into the stripping device.

The gas-solid separator of the present embodiment is different from that of the first embodiment in that a pre-stripping mechanism 13 is incorporated in the lower part of the gas-solid separator so that pre-stripping can be performed in the lower part of the outer cylinder 2.

Specifically, a lower part of the central outer cylinder 2a is further provided with an outer cylinder 2g, and a plurality of stages of baffles 14 are provided on the inner surface. Moreover, an inner cylinder 10g extends below the bottom plate 11 of the inner cylinder 10, and the plurality of stages of the baffles 14 are provided to a circumferential surface of the inner cylinder 10g as well. In addition, annular steam supply means 12 is provided within the outer cylinder 2g and a lower part of the inner cylinder 10g. The particle vent port 3 is connected below the pre-stripping device 13 of the outer cylinder 2g. The solid particles extracted from the particle vent port 3 are fed into a stripping device that is not shown.

In this gas-solid separator, the solid particles that are separated in an upper part of the outer cylinder 2 are dropped while being dispersed by the baffles 14 and then subjected to pre-stripping by the steam supplied from the steam supply means 12. Gas, oil vapor, stripping steam or the like generated from the pre-stripping device 13 is not discharged from the pre-stripping device to the outside the system but is directly fed into the gas-solid separator. In this manner, the pre-stripping effect can be improved and power-saving of the equipment can be achieved. Note that a decrease in the separation efficiency is hardly confirmed even when the pre-stripping mechanism is fed.

Note that the present embodiment uses the type of pre-stripping mechanism (device) that disperses the solid particles using the baffles 14 provided on the surfaces of the outer cylinder 2g and of the inner cylinder 10, but not only this mechanism but also a mechanism equivalent to a type of pre-stripping device that uses a perforated tray (perforated board) or a dense fluidized bed can be adopted.

Examples

Examples 1 to 3, Comparative Example 1

Figure 7:
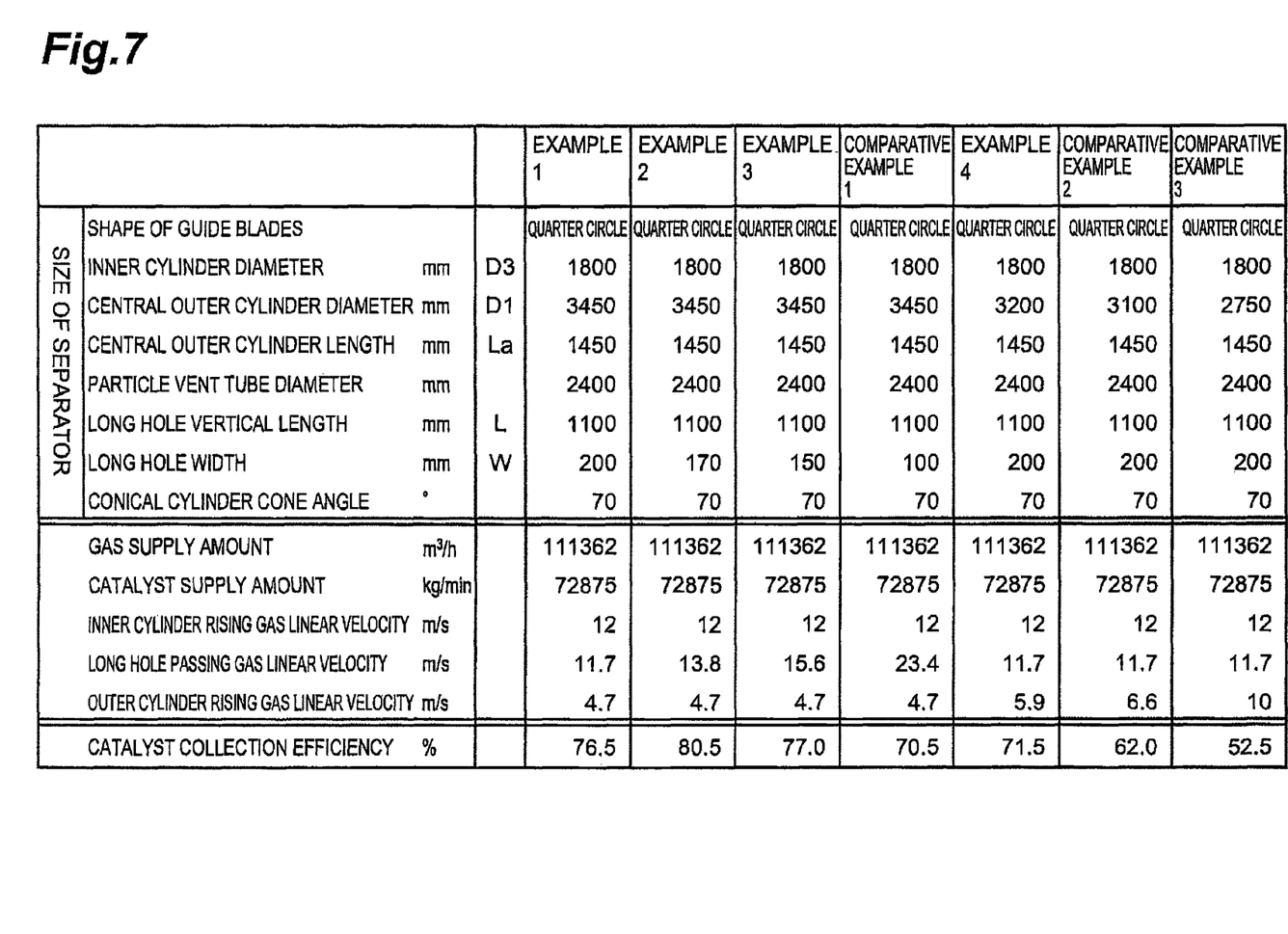
FIG. 7 is a table showing the conditions and results obtained in an example and a comparative example.

The gas-solid separator shown in FIGS. 1 to 4 having the following conditions was used to experiment separation of air of a temperature of 20° C. which contains solid particles having a particle diameter of 60 μm and a particle bulk density of 0.7 g/cm³. The size of the gas-solid separator with the inner diameter D3 of the inner cylinder (≈D3') is shown in FIG. 7. Specifically, the size of the device was determined such that the downward gas velocity within the inner cylinder is set at a constant velocity of 12 m/s and the upward velocity of the gas between the outer cylinder and the inner cylinder at a constant velocity of 4.7 m/s. The long hole passage velocity is changed to 11.7, 13.8, 15.6 and 23.4 by changing the width W of each long hole. Catalyst collection efficiency (unit: %)= (Weight of solid substance extracted from solid-substance vent port)/(Weight of catalyst supplied to separator) is shown in FIG. 7.

Example 1, Example 4, Comparative Example 2, Comparative Example 3

The size of the device was determined such that the downward gas velocity within the inner cylinder is set at a constant velocity of 12 m/s and the long hole gas linear velocity at a constant velocity of 11.7 mls. The upward velocity of the gas between the outer cylinder and the inner cylinder was changed to 4.7, 5.9, 6.6 and 10 by changing the diameter of the outer cylinder.

The invention claimed is:

1. A method of designing a gas-solid separator having an inner cylinder having a closed lower end and an opened upper end, and extending in a vertical direction;
   and an outer cylinder that coaxially covers the inner cylinder from the outside and has a gas vent port formed on the upper end side and communicating with an exterior;
   and a plurality of axially extending long holes formed on a side surface on the lower end side of the inner cylinder in a circumferential direction, one of long side edge parts of each of the long holes being provided with a guide blade that protrudes outward and is inclined circumferentially so as to cover the long hole,
   the method comprising defining the number of the long holes, the opening area of the long holes, the outer diameter of the inner cylinder, the inner diameter of the inner cylinder, and the inner diameter of the outer cylinder to achieve a cross-sectional average linear velocity of a mixture of gas and solid particles that falls through the inner cylinder of 3 to 30 m/s, a cross-sectional average linear velocity of a mixture of gas and solid particles that is discharged from the long holes of 20 m/s or lower and a cross-sectional average linear velocity of a gas rising between the outer cylinder and the inner cylinder in a section where the long holes are formed of 6 m/s or lower.

2. The method according to claim 1, wherein the method achieves a cross-sectional average linear velocity of the gas rising between the outer cylinder and the inner cylinder in the section where the long holes are formed of 5 m/s or lower.

3. The method according to claim 1, wherein the method achieves a cross-sectional average linear velocity of the gas rising between the outer cylinder and the inner cylinder in the section where the long holes are formed ranging from 2 m/s to 6 m/s.

4. The method according to claim 2, wherein the method achieves a cross-sectional average linear velocity of the gas rising between the outer cylinder and the inner cylinder in the section where the long holes are formed ranging from 2 m/s to 5 m/s.

5. The method according to claim 1, wherein the gas-solid separator is used in a fluid catalytic cracking for heavy oil.

6. The method according to claim 1, further comprising fluidly connecting the gas-solid separator to a down-flow type reactor.

7. The method according to claim 1, wherein the method achieves a cross-sectional average linear velocity of the mixture of gas and solid particles that passes through each long hole of 15 m/s or lower.

8. The method according to claim 1, wherein the method achieves a cross-sectional average linear velocity of the mixture of gas and solid particles that passes through each long hole ranging from at least 3 m/s to 20 m/s.

9. The method according to claim 1, comprising defining the width of the long holes to range from 3 mm to $L1/4$, where $L1$ represents the circumferential length of the inner cylinder.

10. The method according to claim 1, comprising defining the width of the long holes to range from $L1/16$ to $L1/64$, where $L1$ represents the circumferential length of the inner cylinder.

11. The method according to claim 1, comprising defining the length of the long holes to range from $0.1La$ to $0.99La$, wherein La represents the height of the outer cylinder.

12. The method according to claim 1, comprising defining the length of the long holes to range from $0.7La$ to $0.95La$, wherein La represents the height of the outer cylinder.

13. The method according to claim 1, comprising defining the cross-section of the guide blade to have an arcuate shape and the apex angle of the guide blade to be 70 to 120 degrees.

14. The method according to claim 1, comprising defining the cross-section of the guide blade to have an arcuate shape and the radius of the arcuate shape to satisfy the equation: $0.4 \times (D1-D3) \leq r \leq 0.5 \times (D1-D3)$, wherein r is radius of the accurate shape, D3 is the outer diameter of the inner cylinder and D1 is the inner diameter of the outer cylinder.

15. The method according to claim 1, comprising defining the protruding length of the guide blade to be $0.5 \times (D1-D3) \times b$, wherein b ranges from 0.2 to 0.99 and D3 is the outer diameter of the inner cylinder and D1 is the inner diameter of the outer cylinder.

16. The method according to claim 1, comprising defining the maximum vertical length of the guide blades to be at least the length of the long hole/2 and the minimum vertical length of the guide blades to be the length of the outer cylinder or lower.

17. The method according to claim 1, comprising defining the vertical length of the guide blades to be the vertical length of each long hole.

18. The method according to claim 1, comprising defining the number of long holes to be at least two.

19. The method according to claim 1, comprising defining the number of long holes to range from eight to sixteen.

20. The method according to claim 1, comprising defining the number of long holes to range from ten to fourteen.

21. The method according to claim 1, comprising defining the number of long holes to be twelve.

22. The method according to claim 1, comprising defining the inner diameter of the central outer cylinder to range from $1.1 \times D3$ to $5 \times D3$, where D3 is the outer diameter of the inner cylinder.

23. The method according to claim 1, comprising defining the inner diameter of the central outer cylinder to range from $1.1 \times D3$ to $3 \times D3$, where D3 is the outer diameter of the inner cylinder.

24. The method according to claim 1, comprising defining the height of the outer cylinder to range from 0.8 to 10 times the inner diameter of the inner cylinder.

25. The method according to claim 1, wherein the solid particles have an average particle diameter ranging from 1 to 500 μm.

26. The method according to claim 1, wherein the solid particles have a bulk density ranging from 0.6 to 0.9 g/cm$^3$.

* * * * *